(12) United States Patent
Sato

(10) Patent No.: US 8,564,675 B2
(45) Date of Patent: Oct. 22, 2013

(54) IMAGE-SHAKE CORRECTION DEVICE, LENS BARREL, AND OPTICAL APPARATUS

(75) Inventor: Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/235,248

(22) Filed: Sep. 16, 2011

(65) Prior Publication Data

US 2012/0081559 A1    Apr. 5, 2012

(30) Foreign Application Priority Data

Sep. 30, 2010  (JP) ................................. 2010-221795

(51) Int. Cl.
*H04N 5/228* (2006.01)
*G03B 17/00* (2006.01)

(52) U.S. Cl.
USPC ............. 348/208.11; 348/208.7; 396/52; 396/55; 359/824

(58) Field of Classification Search
USPC ........ 348/208.11, 208.7; 396/52, 55; 359/824
See application file for complete search history.

(56) References Cited

U.S. PATENT DOCUMENTS

2006/0285839 A1\* 12/2006 Tomita ............................. 396/55
2009/0232483 A1\* 9/2009 Anshita ........................... 396/55

FOREIGN PATENT DOCUMENTS

JP        3229899 B2     11/2001
JP     2002-196382 A     7/2002

\* cited by examiner

*Primary Examiner* — Roberto Velez
*Assistant Examiner* — Quan Pham
(74) *Attorney, Agent, or Firm* — Canon USA Inc IP Division

(57) ABSTRACT

A yoke of an actuator for driving a shift moving frame in a pitch direction is shaped such that when the shift moving frame is moved in the pitch direction, a magnetic attractive force for reducing a moment acting on the shift moving frame due to a magnetic attractive force generated between the magnet and the yoke of an actuator for driving the shift moving frame in a yaw direction is generated between the yoke and the magnet of the actuator for driving in the pitch direction.

11 Claims, 11 Drawing Sheets

IMAGE-SHAKE CORRECTION DEVICE, LENS BARREL, AND OPTICAL APPARATUS

BACKGROUND OF THE INVENTION

1. Field of the Invention

The present invention relates to an image-shake correction device configured to shift a lens to correct image shake occurring due to camera shake in an optical apparatus such as a digital camera or a video camera.

2. Description of the Related Art

In connection with the lens barrel of an optical apparatus such as a digital camera, there is a method of correcting image shake occurring due to camera shake or the like during shooting, according to which an image-shake correction lens is shifted along a plane orthogonal to the optical axis.

Japanese Patent Application Laid-Open No. 2002-196382 discusses an image-shake correction device which is composed of a moving coil type shift unit (an image-shake correction device), wherein a magnet is arranged on a base member on a stationary side, and a yoke and a coil are arranged on a shift member holding a lens on a movable side. Three balls are arranged between the base member and the shift member, and the shift member is urged toward the base member to hold the balls therebetween by an attractive force magnetically exerted between the magnet and the yoke (hereinafter referred to as the "magnetic attractive force"). Thus, when the coil is energized, due to the Lorentz force exerted between the coil and the magnet, the shift member is shifted along a plane orthogonal to the optical axis while rolling the balls, thereby effecting image-shake correction.

However, the shift unit discussed in Japanese Patent Application Laid-Open No. 2002-196382 has an issue in that it involves a rotational movement within the optical-axis orthogonal plane of the shift member holding the correction lens. The issue will be discussed below. First, a magnetic attractive force is exerted between the magnet arranged on the base member on the stationary side and the yoke arranged on the shift member. Thus, there exists a magnetic equilibrium position for the magnet and the yoke. When the positional relationship between the magnet and the yoke deviates from the equilibrium position, there is exerted a force restoring them to the former position (hereinafter referred to as the restoring force). Thus, in the shift unit having two driving units respectively driving the shift member in the vertical direction (hereinafter referred to as the pitch direction) and the horizontal direction (hereinafter referred to as the yaw direction) along a plane orthogonal to the optical axis, a positional change in one driving unit generates a restoring force for the other driving unit. For example, when the shift member is moved in the yaw direction, the above-mentioned restoring force is generated for the pitch-direction driving unit, so that there is generated a moment causing the shift member to rotate in the optical-axis-orthogonal plane. Thus, when there is no unit regulating the rotation of the shift member in the optical-axis-orthogonal plane, the shift member is allowed to rotate during the image-shake correction operation. If, as a result of this rotation, the shift member is brought into contact with the stationary member, there may be generated a collision sound or image disturbance. Further, in the case where the components suffer damage from contact, there may be some problem involved in the driving of the shift member thereafter. Thus, in order that the shift member may not come into contact with the peripheral stationary members if it rotates, the distance between them must be large enough. However, this results in an increase in the size of the components, which leads to an increase in the size of the lens barrel.

The shift unit position detection sensor is formed by a combination of a magnet and a magnetic detection element, of a light emitting element and a light receiving element, etc. This position detection sensor is arranged on the assumption that the movement (position) of the correction lens in one of the following directions is to be detected: a yaw direction, which is a horizontal direction, and a pitch direction, which is a vertical direction. Thus, when the shift member rotates greatly, the output characteristics of the position detection sensor undergoes a change, making it impossible to effect accurate position detection; and crosstalk is generated. Further, when the position detection undergoes a change through rotation, it can happen that feedback control of the position of the correction lens is caused, resulting in deterioration in optical performance at the time of image-shake correction.

Here, as discussed in Japanese Patent No. 3229899, it might be possible to regulate the rotation by providing a guide shaft as a unit for reducing the rotation of the shift member in the direction parallel to the plane orthogonal to the optical axis of the shift member. However, this involves provision of a new guide member for regulating the rotation, which may lead to an increase in the size of the apparatus.

SUMMARY OF THE INVENTION

According to an aspect of the present disclosure, an image-shake correction device for correcting image shake includes a shift member configured to support a lens, a first driving unit configured to move the shift member in a first direction along a plane orthogonal to an optical axis, and a second driving unit configured to move the shift member in a second direction that is different from the first direction along the plane orthogonal to the optical axis, wherein each of the first and second driving units includes a magnet, a coil, and a yoke configured to generate a magnetic attractive force between the yoke and the magnet, with the shift member being moved by the magnetic attractive force developed as a result of energizing the coil, and wherein, to generate a magnetic attractive force for reducing a moment acting on the shift member due to the magnetic attractive force generated between the magnet and the yoke of the second driving unit when the first driving unit is driven, the yoke of the first driving unit is shaped such that when the yoke of the first driving unit is divided into two portions by a straight line parallel to the first direction and passing a middle of a width of the yoke of the first driving unit in a direction orthogonal to the first direction in the plane orthogonal to the optical axis, an amount of magnetic flux from the magnet of the first driving unit passing through the yoke of the first driving unit is larger in one of the two portions nearer to the second driving unit than in another of the two portions farther from the second driving unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects will be described in detail below with reference to the drawings.

Figure 2:
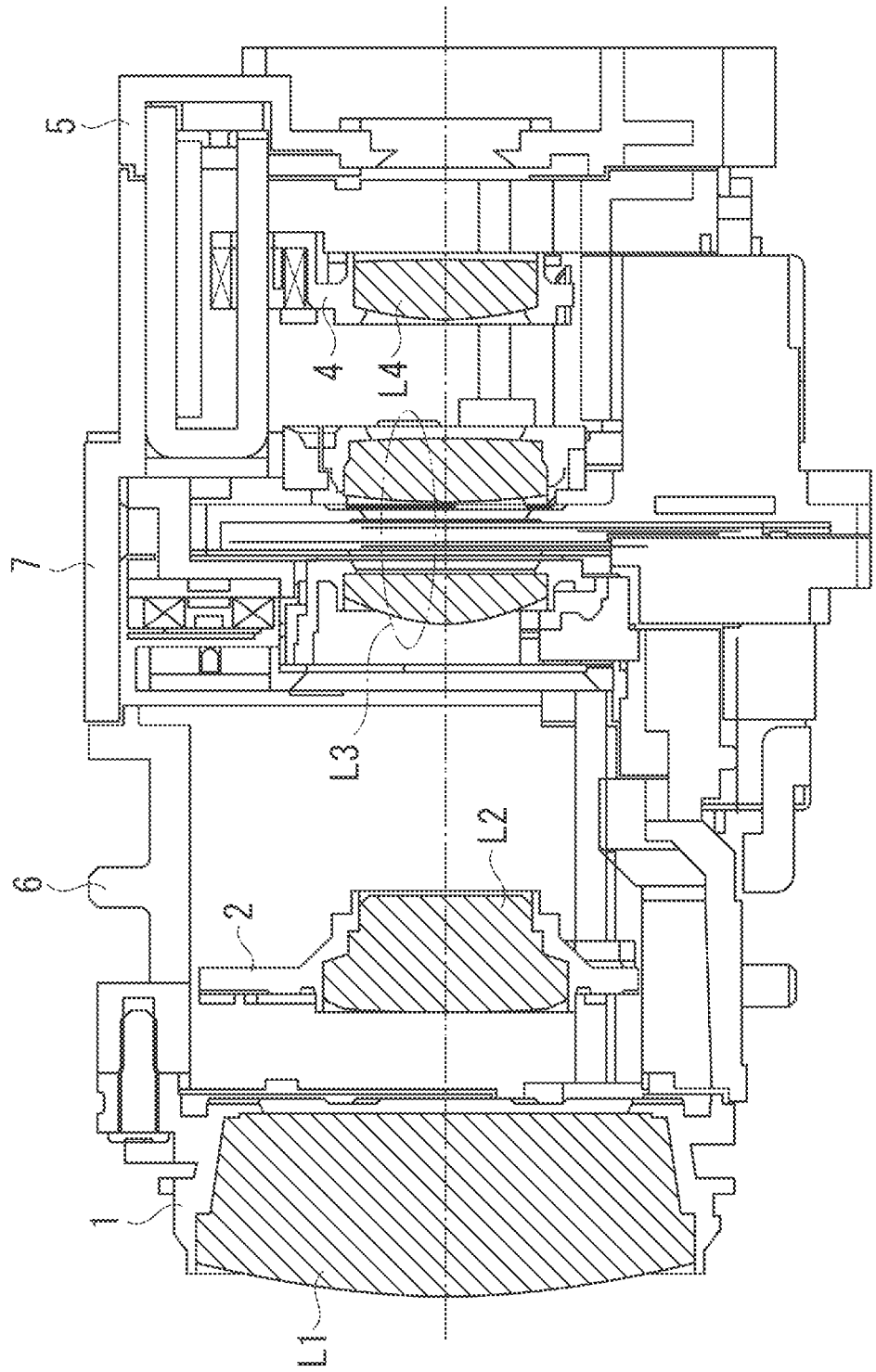
FIG. 2 is a sectional view of a lens barrel using a shift unit according to an exemplary embodiment of the present invention.
Figure 3:
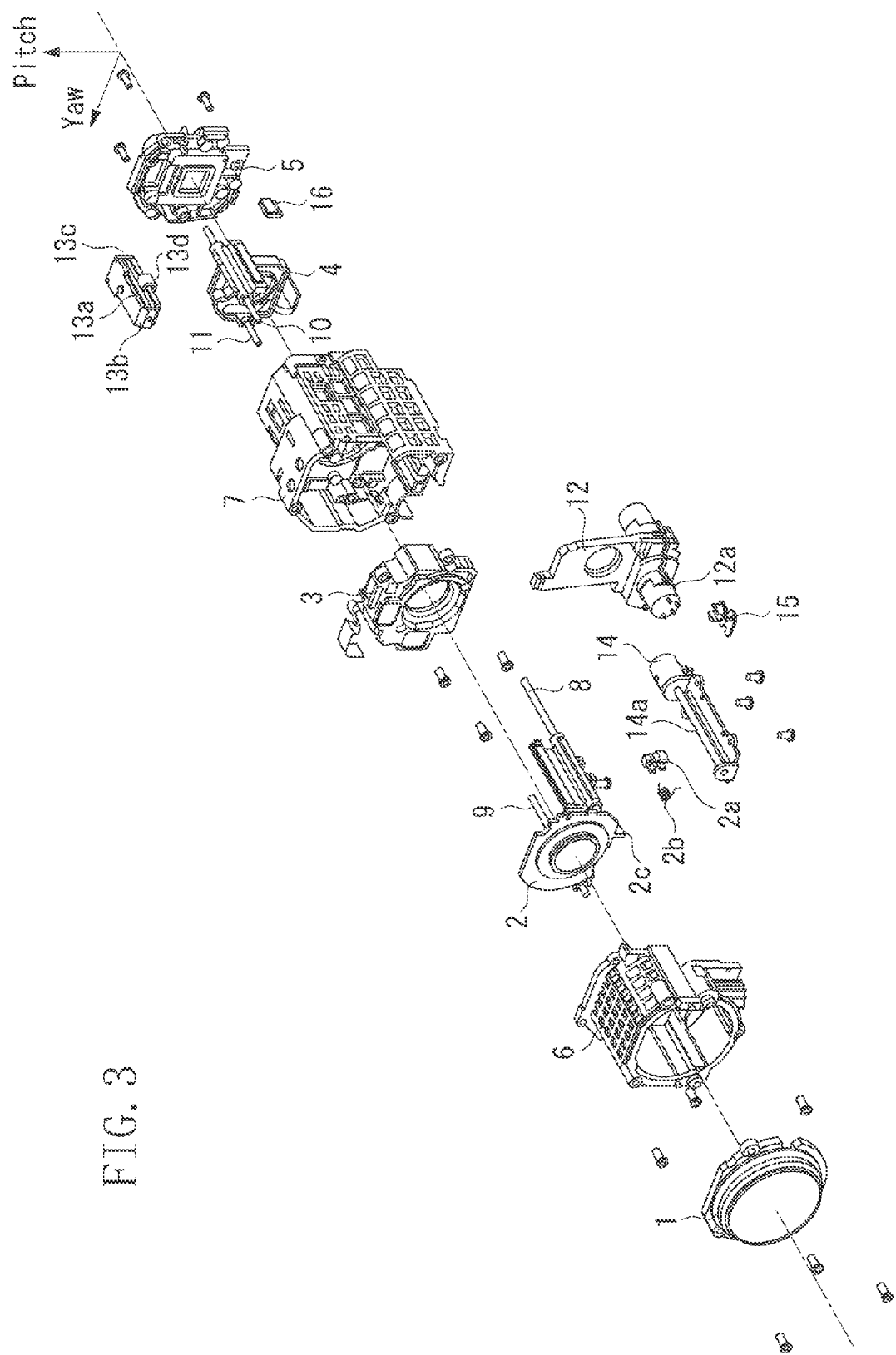
FIG. 3 is a perspective view of a lens barrel using a shift unit according to an exemplary embodiment of the present invention.

FIGS. 2 and 3 are diagrams illustrating a lens barrel equipped with a shift unit according to an exemplary embodiment. This lens barrel is provided so as to be detachable from a photographing apparatus (e.g., an optical apparatus) such as a video camera or a digital still camera, or so as to be integral therewith.

This lens barrel may be one having a variable magnification optical system (zoom lens) composed of four lens groups of positive, negative, positive, and positive refractive force, for example. Numeral L1 indicates a first, stationary lens group, and numeral L2 indicates a second lens group configured to move in an optical axis direction to perform a zooming function. Numeral L3 indicates a third lens group configured to move along an axis in a plane orthogonal to the optical axis to thereby effect image-shake correction, and numeral L4 indicates a fourth lens group configured to move in the optical axis direction to thereby perform focusing action. A fixed tube 1 holds (i.e. supports or constrains) the first lens group L1, and a second-lens-group moving frame 2 holds the second lens group L2. A shift unit 3 (image-shake correction device) moves the third lens group L3 in a direction orthogonal to the optical axis, and a fourth-lens-group moving frame 4 holds the fourth lens group L4. An imaging device (image sensor) such as a charge-coupled device (CCD) is fixed to a CCD holder 5. In a case where the lens barrel is an interchangeable lens, the lens barrel does not include the CCD holder 5; amount is provided between the fourth-lens-group moving frame L4 and the CCD holder 5, whereby the lens barrel is made detachable from the camera body.

The fixed tube 1 is fixed to an anterior fixed tube 6 by screws, and the CCD holder 5 and the anterior fixed tube 6 are fixed to a posterior fixed tube 7 by screws. Guide bars 8, 9, 10, and 11 are fixed in position by the anterior fixed tube 6 and the posterior fixed tube 7. The guide bars 8 and 9 support the moving frame 2 so as to permit movement in the optical axis direction. The guide bars 10 and 11 support the moving frame 4 so as to permit movement in the optical axis direction. The shift unit 3 is set in position on the posterior fixed tube 7, and is fixed thereto by screws.

A diaphragm device 12 for varying the aperture diameter of the optical system is a guillotine type diaphragm device, which varies the aperture diameter by moving, for example, two diaphragm blades, in opposite directions. A voice coil motor (VCM) 13 drives the fourth lens group L4 in the optical axis direction to perform a focusing action. The VCM 13 is composed of a magnet 13a, yokes 13b and 13c, and a coil 13d; by passing an electric current through the coil 13d, Lorentz force is generated in the coil 13d, thereby driving the coil 13d in the optical axis direction. The coil 13d is fixed to the moving frame 4, which moves in the optical axis direction through the driving of the coil 13d. The VCM 13 forces the yoke 13b into the posterior fixed tube 7 for fixation, and the magnet 13a and the yoke 13c are fixed to the yoke 13b by a magnetic force.

A zoom motor 14 drives the second lens group L2 in the optical axis direction to perform zooming. The zoom motor 14 has a lead screw 14a coaxial with a rotating rotor. The lead screw 14a is engaged with a rack 2a mounted to the second-lens-group moving frame 2, and the second lens group L2 is driven in the optical axis direction through the rotation of the rotor. A torsion coil spring 2b biases the play (i.e., an amount free or unimpeded movement) of each of the second-lens-group moving frame 2, the guide bars 8 and 9, the rack 2a, and the lead screw 14a, reducing the play in their fit-engagement or meshing. The zoom motor 14 is fixed to the posterior fixed tube 7 by two screws.

A photo interrupter 15 is used as a zoom reset switch which optically detects movement in the optical axis direction of a shielding portion 2c formed on the second-lens-group moving frame 2 and which detects that the second lens group L2 is situated at a reference position. An optical sensor 16 applies light emitted from a light emitting portion to a scale 17 bonded to the fourth-lens-group moving frame 4, and the reflected light is read by a light receiving portion of the optical sensor 16, and the position of the fourth lens group L4 is detected.

Figure 1:
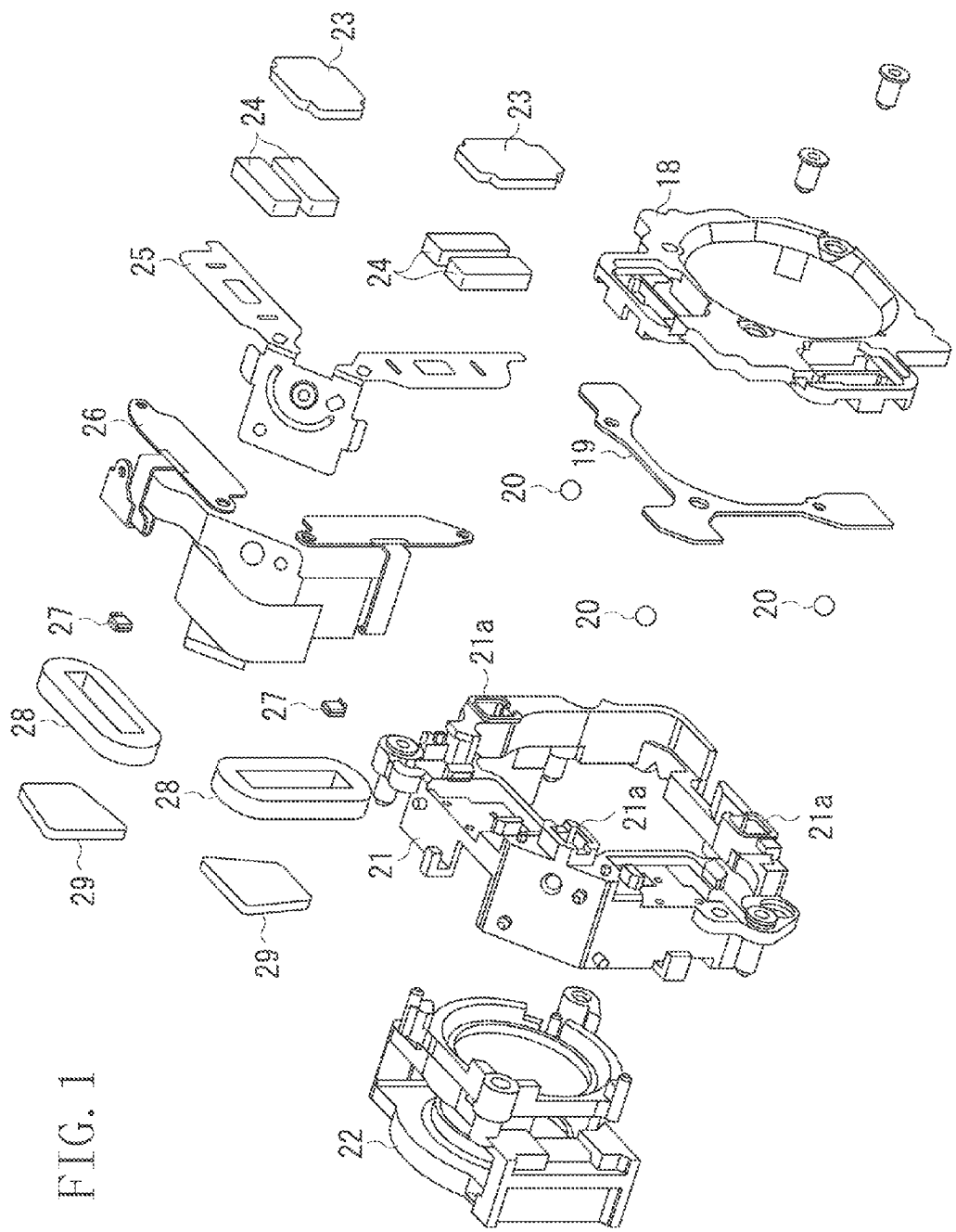
FIG. 1 is an exploded perspective view of a shift unit according to an exemplary embodiment of the present invention.
Figure 4:
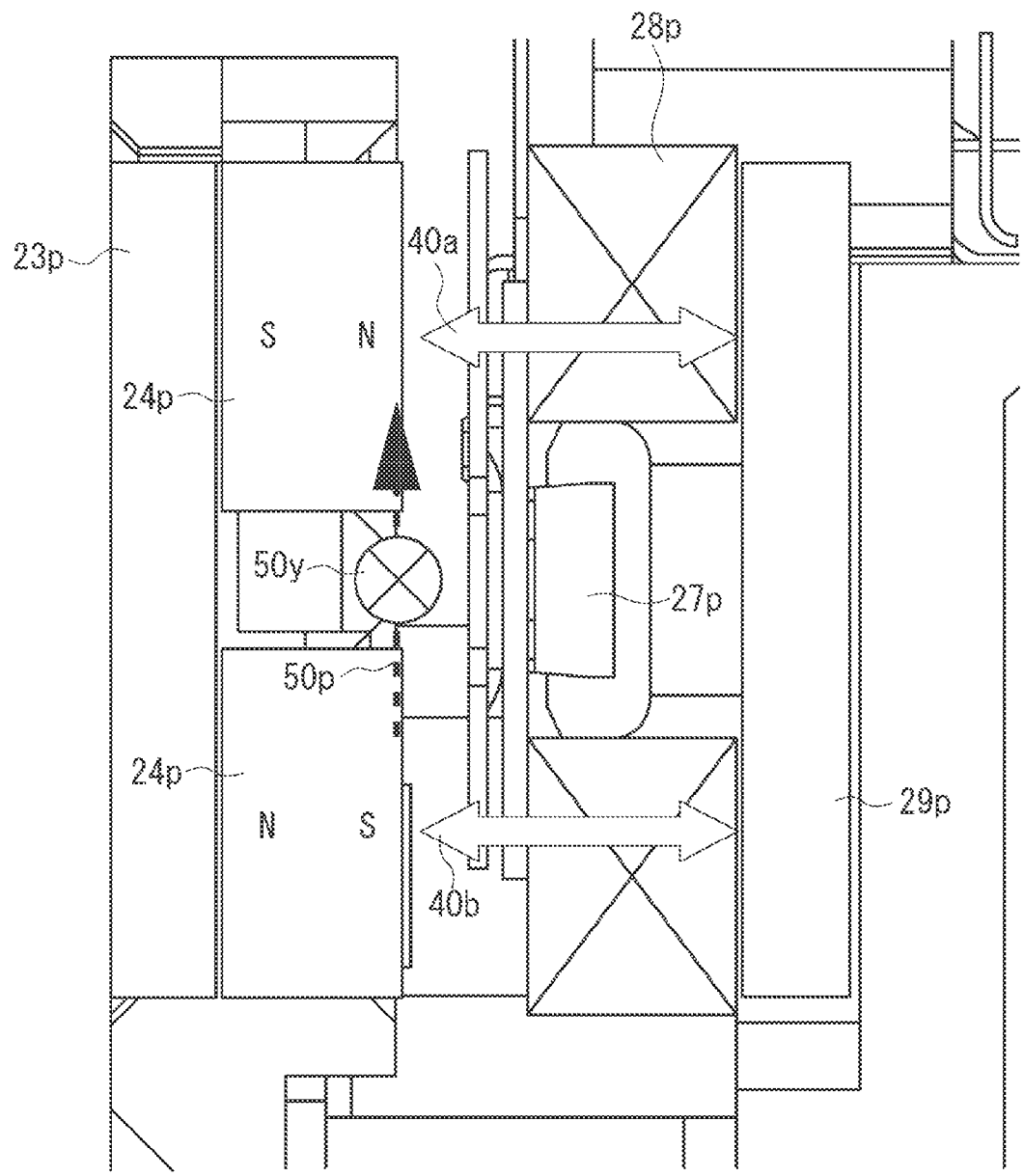
FIG. 4 is a sectional view of a pitch-direction driving unit of a shift unit according to an exemplary embodiment of the present invention.

Next, with reference to FIGS. 1 and 4, the construction of the shift unit 3 moving the third lens group L3, which is the lens group for image-shake correction, in a direction orthogonal to the optical axis, will be illustrated. FIG. 4 is a sectional view along a plane parallel to the optical axis of the driving unit in the pitch direction when the center of the third lens group L3 is on the optical axis of the variable magnification optical system. The third lens group L3 is driven (i.e., moves) along a plane orthogonal to the optical axis by an actuator for correcting image shake due to an angular change in the pitch direction (the vertical direction of the lens barrel) and an actuator for correcting image shake due to an angular change in the yaw direction (the horizontal direction of the lens barrel). Here, the pitch direction will be referred to as the first direction, and the actuator for moving the third lens group L3 in the pitch direction will be referred to as the first driving unit. Further, the yaw direction will be referred to as the second direction, and the actuator for moving the third lens group L3 in the yaw direction will be referred to as the second driving unit. The actuators are controlled independently in the pitch direction and the yaw direction, respectively, based on information from their respective position sensors and shake detection sensors. The actuator and the position sensor for the pitch direction and the actuator and the position sensor for the yaw direction are arranged such that their positions around the optical axis make an angle of 90 degrees; they are, however, of the same construction. In view of this, the following description will discuss the pitch direction. Unless otherwise specified, the elements in the pitch direction are indicated by reference numerals with the additional character p affixed thereto, and the elements in the yaw direction are indicated by reference numerals with the additional character y affixed thereto.

A shift lens frame 22 (shift member) at least has the function of holding the third lens group L3. To effect image-shake correction in response to the driving forces due to the first and second driving units, the shift lens frame 22 displaces the third lens group L3 in a direction orthogonal to the optical axis. A magnet 24 is forced into a magnet base 18 and is affixed therein. By assembling the magnet 24 to the magnet base 18 through forcing-in, there may be generated no positional deviation between the magnet base 18 and the magnet 24 after the assembly. The magnet base 18 is fixed to the shift lens frame 22 by screws. Thus, the position of the magnet 24 is determined to a position fixed with respect to the shift lens group 22 holding the third lens group L3.

The shift lens frame 22 and the magnet base 18 are fixed to each other by screws, with a metal plate 19 being held between them. Examples of the suitable material of the metal plate 19 include stainless steel. Balls 20 are arranged between a shift base 21 and a magnet base 18; there are three balls 20, which are arranged in a plane orthogonal to the optical axis at angular positions of 0 degrees, 120 degrees, and 240 degrees around the optical axis. Due to the presence of the metal plate 19, it is possible to prevent the magnet base 18, which can be a molded component, from being dented by the balls 20 when the lens barrel receives a shock. Further, it is possible to prevent deterioration in the driving characteristics of the shift unit 3 due to wear generated by the driving for long-term image-shake correction. The balls 20 are held in ball holder portions 21a formed in the shift base 21 so as to be capable of rolling. Examples of the suitable material of the balls 20 include, but are not limited to a non-magnetic material such as Steel Use Stainless (SUS) 304, which is not attracted by the magnet 24 arranged in the vicinity thereof.

The force for reliably keeping the balls 20 in contact with the shift base 21 (the end surfaces in the optical axis direction of the ball holder portions 21a) and the magnet base 18 (metal plate 19), is a magnetic attractive force exerted between the magnet 24 and a yoke 29 holding a coil 28. Due to this attractive force, the magnet base 18 is urged toward the shift base 21, whereby the three balls 20 are held in a pressed state between the end surfaces in the optical axis direction of the three ball holder portions 21a and three portions of the metal plate 19. The surfaces with which the three balls 20 are held in contact extend in a direction orthogonal to the optical axis of the variable magnification optical system, and the three balls 20 are of the same nominal diameter. Thus, the positional difference in the optical axis direction between the end surfaces in the optical axis direction of the three ball holder portions 21a is minimized, whereby it is possible to move the third lens group L3 held by the shift lens frame 22 in a plane orthogonal to the optical axis without involving inclination of the third lens group L3 with respect to the optical axis.

Next, an actuator for driving the magnet base 18 and the third lens group L3 will be illustrated. As illustrated in FIG. 4, numeral 24p indicates a magnet double-pole magnetized in the radiation direction from the optical axis, and numeral 23p indicates a yoke for closing the magnetic flux on the front side in the optical direction of the magnet 24p. The yoke 23p is attracted by and fixed to the magnet 24p. Numeral 28p indicates a coil bonded to a shift base 21, and numeral 29 indicates a yoke for closing the magnetic flux on the rear side in the optical direction of the magnet 24p. The yoke 29 is arranged on the opposite side of the magnet 24p with the coil 28 being therebetween. The magnet 24p, the yoke 23p, the yoke 29p, and the coil 28p form a magnetic circuit. Examples of a material suitable for the yoke include a magnetic material such as SPCC, which has high magnetic permeability. When an electric current is passed through the coil 28p, there is generated a Lorentz force due to mutual repulsion of magnetic lines of force generated in the magnet 24p and the coil 28p in a direction substantially orthogonal to the magnetization boundary of the magnet 24p, with the result that the magnet base 18 is moved in a direction orthogonal to the optical axis. This construction corresponds to a moving magnet type actuator. In the case of a moving coil type actuator, the wiring to the coil is moved, so that excessive force may be applied, whereas, in the case of a moving magnet type actuator, it is possible to reduce such an influence, making it possible to appropriately perform image-shake correction.

Two actuators of such a construction are respectively arranged in the vertical direction and the horizontal direction, making it possible to drive the magnet base 18 and the shift lens frame 22 in two directions orthogonal to the optical axis and orthogonal to each other. Further, through synthesis of the drives in the two directions orthogonal to each other, it is possible to freely move the magnet base 18 and the shift lens frame 22 within a predetermined range in a desired direction along a plane orthogonal to the optical axis. So long as the balls 20 do not abut on the walls of the ball holder portions 21a, the friction involved when the magnet base 18 moves in a direction orthogonal to the optical axis is restricted to the rolling friction generated between the balls 20 and the metal plate 19 and between the balls 20 and the ball holder portions 21a. Thus, despite the attractive force exerted, the magnet base 18 (that is, the shift lens frame 22 holding the third lens group L3) can move smoothly along a plane orthogonal to the optical axis, and it is possible to perform fine movement amount control. By applying lubricating oil to the balls 20, it is possible to further reduce the frictional force.

While in this example the balls 20 are adopted, it is also possible to provide protrusions instead of the balls, causing the shift base to slide on the protrusions.

Next, the detection of the positions of the magnet base 18 and the third lens group L3 will be illustrated. Numeral 27p indicates a Hall element converting magnetic flux density to an electric signal; it is soldered to a flexible print cable (FPC) 26. The FPC 26 is set in position with respect to the shift base 21. By fixing an FPC holding member 25 to the shift base 21 by screws, rising of the FPC 26 is prevented, and a positional deviation of the Hall element 27p is prevented. When the magnet base 18 and the third lens group L3 are driven in the vertical direction or the horizontal direction, a change in the magnetic flux density of the magnet 24p is detected by the Hall element 27p, and an electric signal indicating this change in magnetic flux density is output. Based on the Hall element 27p, a control circuit (not illustrated) can detect the positions of the magnet base 18 and the third lens group L3. The magnet 24p serves not only as a driving magnet but also as a position detection magnet.

As taught by the Coulomb's law, the attractive force exerted between the magnet 24p and the yoke 29p is in proportion to the magnitude of the magnetic load of two objects and the reciprocal of the square of the distance between them. Thus, when the magnet 24p is at the central position of the driving unit, the attractive forces in the pitch direction and the yaw direction are in equilibrium. In other words, the attractive forces 40a and 40b exerted between the magnet 24p and the yoke 29p are in equilibrium, and the positional relationship between the magnet 24p and the yoke 29p is determined. At this time, the restoring force 50p in the pitch direction is approximately zero, and the restoring force 50y in the yaw direction is also approximately zero.

Figure 5A:
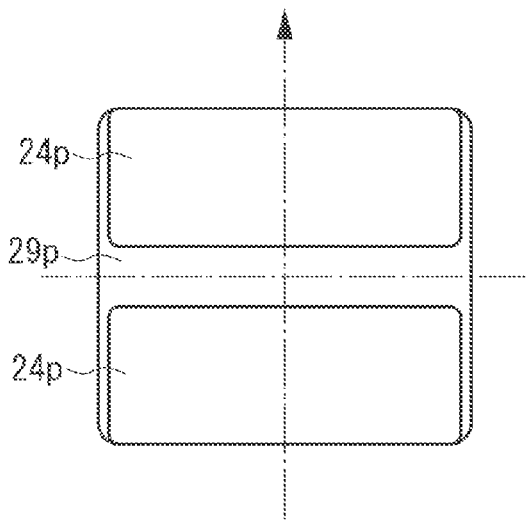
FIGS. 5A through 5E are explanatory views illustrating the restoring force of a shift unit according to a conventional example.
Figure 5B:
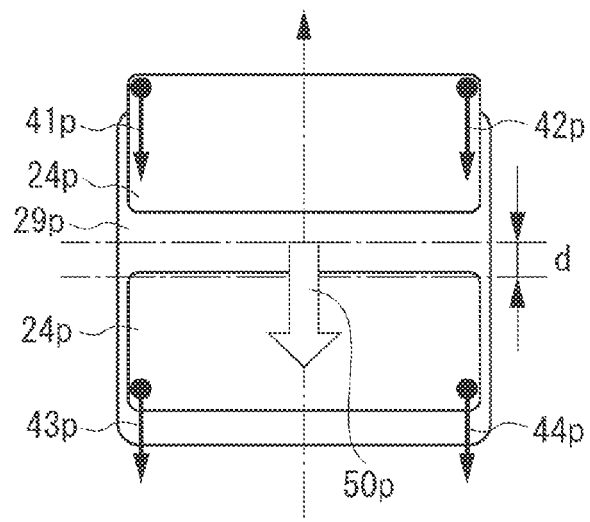
Figure 5C:
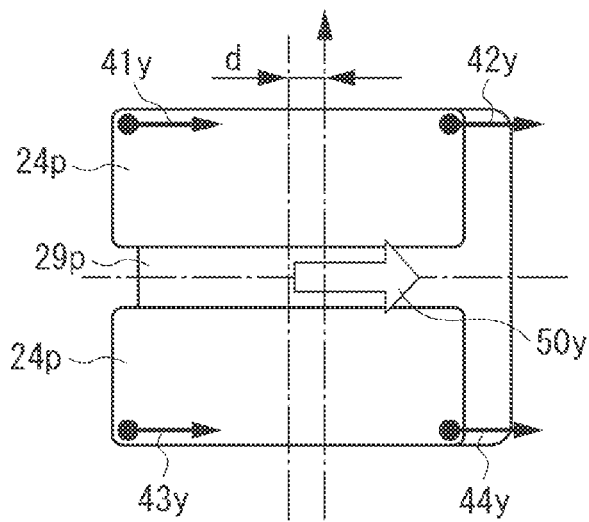
Figure 5D:
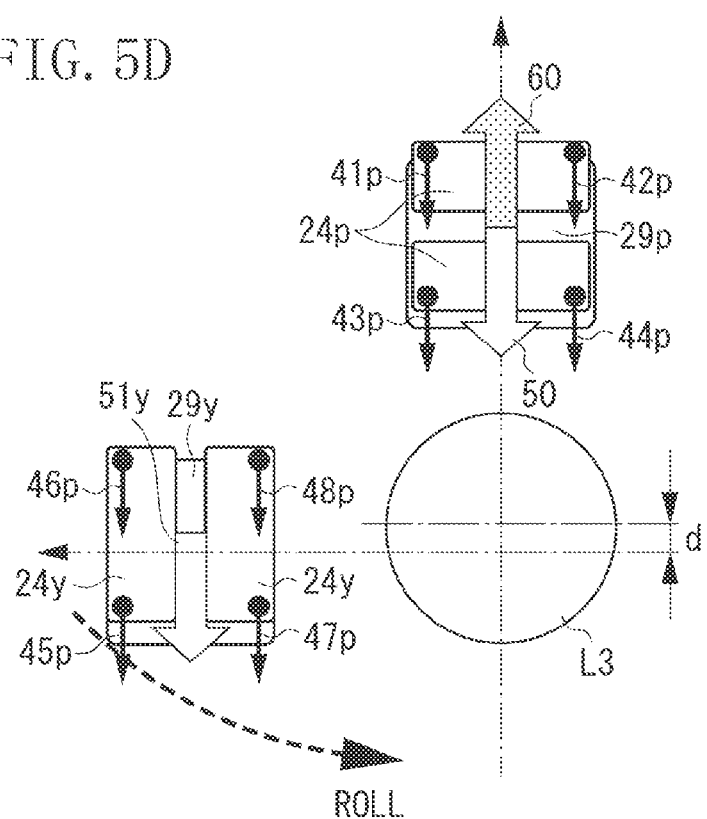
Figure 5E:
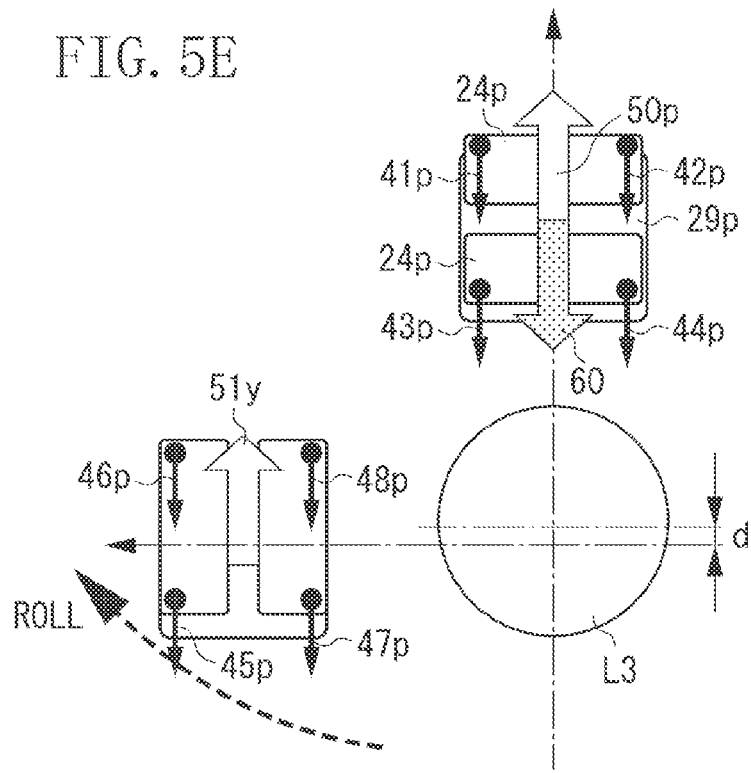

Next, the relationship between the shift member (shift lens frame) and the restoring force due to the attractive force in a conventional example will be described with reference to FIGS. 5A through 5E. FIGS. 5A through 5C are diagrams illustrating the driving unit in the pitch direction as seen from the front side (subject side) of the shift unit. FIGS. 5D and 5E are diagrams illustrating the driving units in the pitch direction and the yaw direction and the shift member as seen from the front side (subject side) of the shift unit. The members other than the magnet 24, the yoke 29, and the third lens group L3 are not illustrated. As illustrated in FIG. 5A, in the conventional example, the projection of the yoke 29 onto a plane orthogonal to the optical axis is of a substantially rectangular configuration. Here, as illustrated in the diagrams, the restoring forces acting on the four corner portions of the magnet 24p will be referred to as restoring forces 41 through 44. Similarly, as illustrated in the diagrams, the restoring forces acting on the four corner portions of the magnet 24y will be referred to as restoring forces 45 through 48.

FIG. 5A illustrates the driving unit in the pitch direction in the case where the center of the third lens group L3 is on the optical axis of the variable-magnification optical system. At this time, the magnet 24p is situated at the central position with respect to the yoke 29p, so that the restoring forces 41 through 44 acting on the four corner portions are in equilibrium. That is, the restoring force 50p in the pitch direction and the restoring force 50y in the yaw direction are approximately zero.

FIG. 5B illustrates the driving unit in the pitch direction in the case where the center of the third lens group L3 has moved in the pitch direction by a distance d. From the state of FIG. 5A, the positional relationship between the magnet 24p and the yoke 29p is changed to generate the restoring force 50p. Here, the configurations of the magnet 24p and the yoke 29p are symmetrical with respect to the driving direction, so that the magnitudes of the restoring forces 41p and 42p are substantially equal to each other, and the magnitudes of the restoring forces 43p and 44p are substantially equal to each other. Since no movement has been made in the yaw direction, the restoring force 50y is approximately zero as in the case of FIG. 5A.

Next, FIG. 5C illustrates the driving unit in the pitch direction in the case where the center of the third lens group L3 has moved in the yaw direction by the distance d. In this case also, the positional relationship between the magnet 24p and the yoke 29p is changed to generate the restoring force 50y. That is, there is exerted a force to restore the driving unit to the state of FIG. 5A, where it is magnetically stabilized. Here, the configurations of the magnet 24p and the yoke 29p are symmetrical with respect to the driving direction, so that the magnitudes of the forces 41y and 43y are substantially equal to each other, and the magnitudes of the forces 42y and 44y are substantially equal to each other. Since no movement has been made in the pitch direction, the restoring force 50p is approximately zero as in the case of FIG. 5A.

FIG. 5D illustrates the case in which the center of the third lens group L3 has moved in the pitch direction by the distance d. As illustrated with reference to FIG. 5B, the restoring force 50p in the pitch direction is exerted on the magnet 24p. However, due to a Lorentz force 60 generated through energization of the coil 28p (not illustrated), it is possible to move the shift member. On the other hand, as illustrated with reference to FIG. 5C, the restoring force 51y is exerted on the yaw side magnet 24y. Due to this restoring force 51y, a rotation moment around an axis parallel to the optical axis is exerted on the shift member. As a result, as illustrated in the diagram, a counterclockwise rotational motion is generated in the shift member. Then, the shift member comes to rest at a position where all of the rotation moment, the restoring force, the Lorentz force, etc., are in equilibrium.

FIG. 5E illustrates a case where the center o the third lens group L3 has moved in a direction opposite to that of FIG. 5D by the distance d. As in the case of FIG. 5D, due to the restoring force 51y generated in the magnet 24y and the yoke 29y on the yaw side, a rotation moment around an axis parallel to the optical axis is exerted on the shift member. As a result, as illustrated in the diagram, a clockwise rotational motion is generated in the shift member. Then, the shift member comes to rest at a position where all of the rotation moment, the restoring force, the Lorentz force, etc., are in equilibrium.

Figure 6A:
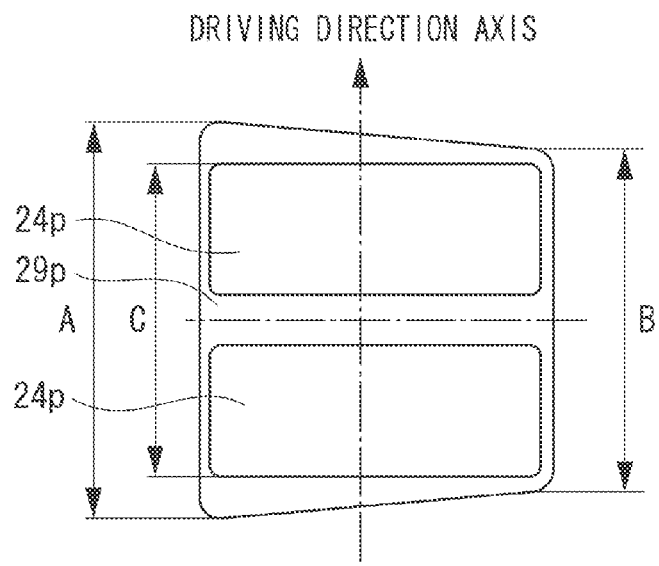
FIGS. 6A through 6E are explanatory views illustrating the restoring force of a shift unit according to an exemplary embodiment of the present invention.
Figure 6B:
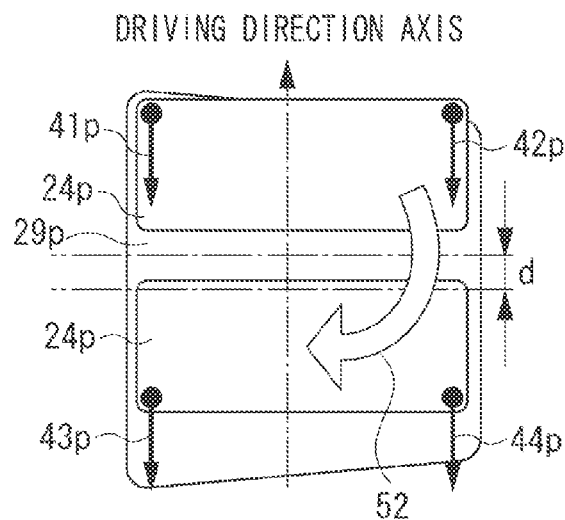
Figure 6C:
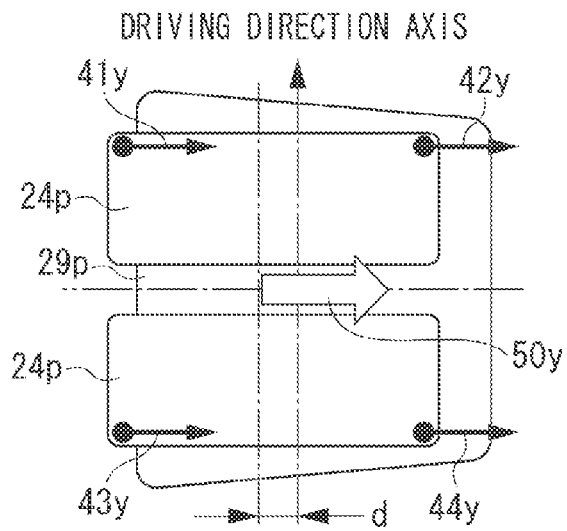
Figure 6D:
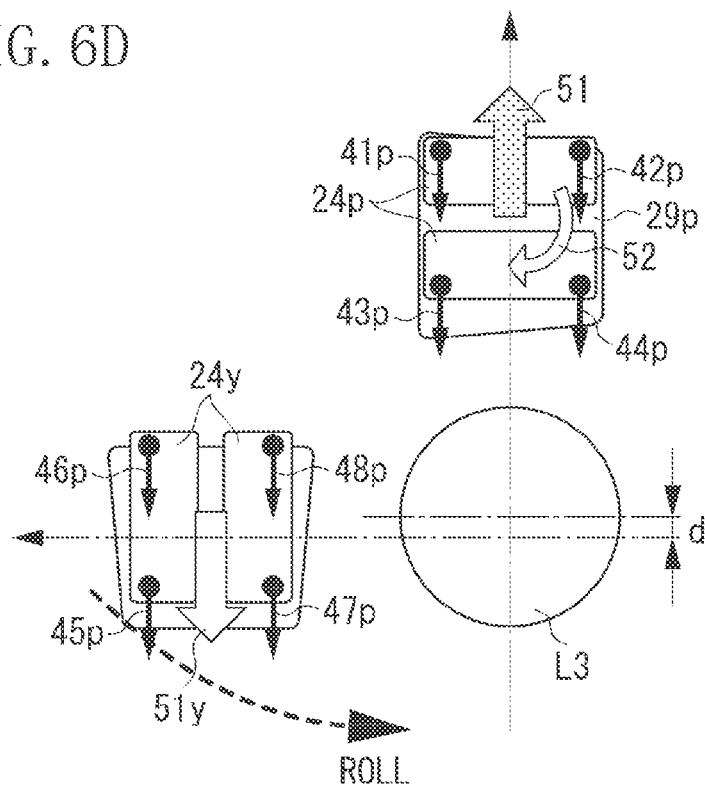
Figure 6E:
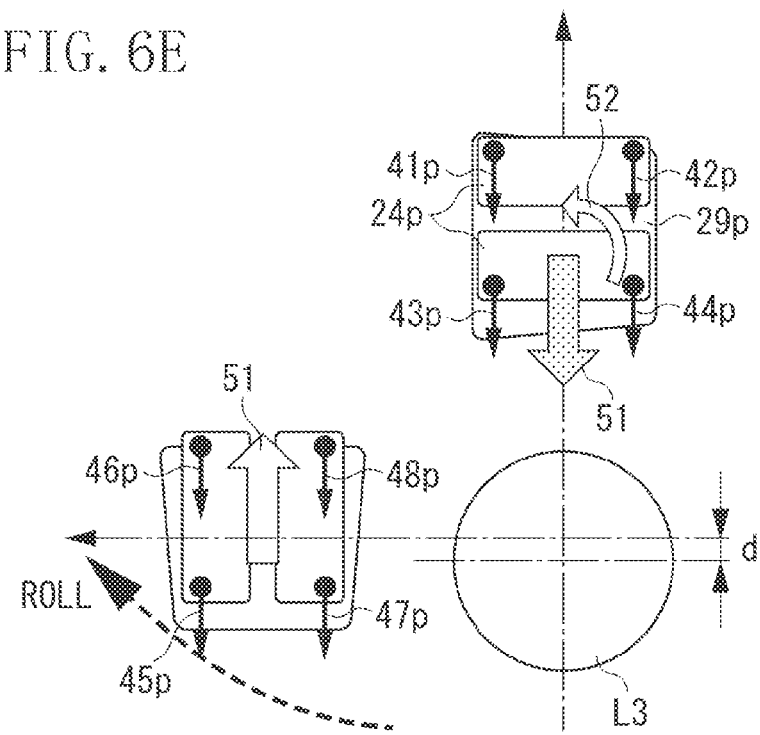

Next, with reference to FIGS. 6A through 6E, the relationship between the movement of the shift member and the restoring force due to the attractive force in the present exemplary embodiment will be illustrated. FIGS. 6A through 6C are diagrams illustrating the driving unit in the pitch direction (first driving unit) as seen from the front side (subject side) of the shift unit. FIGS. 6D and 6E are diagrams illustrating the driving unit in the pitch direction, the driving unit in the yaw direction (second driving unit), and the third lens group L3 as seen from the front side (subject side) of the shift unit. The members other than the magnet 24, the yoke 29, and the third lens group L3 are not illustrated. As illustrated in FIG. 6A, the projection of the yoke 29, which constitutes a feature of the present exemplary embodiment, onto a plane orthogonal to the optical axis is substantially of a trapezoidal configuration. The projection of the magnet 24 onto a plane orthogonal to the optical axis is substantially of a rectangular configuration whose longitudinal direction is orthogonal to the driving direction. Here, the yoke 29 and the magnet 24 are of a "substantially" trapezoidal and rectangular configuration since it is not necessary for them to be of a perfect trapezoidal and rectangular configuration; for example, they may be of a configuration whose corner portions are rounded or beveled. Here, as illustrated in the diagrams, the restoring forces acting on the four corner portions of the magnet 24p are referred to as the restoring forces 41 through 44. Similarly, as illustrated in the diagrams, the restoring forces acting on the four corner portions of the magnet 24y will be referred to as the restoring forces 45 through 48.

FIG. 6A illustrates the driving unit in the pitch direction in the case where the center of the third lens unit L3 is on the optical axis. At this time, the magnet 24p is at the central position with respect to the yoke 29p, and the four corner portions of the magnet are substantially on the inner side of the projection of the yoke 29 onto the plane orthogonal to the optical axis, so that the restoring forces 41 through 44 at the four corner portions are in equilibrium. That is, the restoring force 50p in the pitch direction and the restoring force 50y in the yaw direction are approximately zero.

FIG. 6B illustrates the driving unit in the pitch direction in the case where the center of the third lens group L3 has moved in the pitch upward direction by the distance d by driving the driving unit in the pitch direction. From the state of FIG. 6A, the positional relationship between the magnet 24p and the yoke 29p is changed to generate a restoring force between the magnet 24p and the yoke 29p. That is, there is exerted a force restoring a state that is magnetically stable. Here, in the projection of the yoke 29 onto a plane orthogonal to the optical axis, the portion around the magnet restoring force 42p is outside the range of the configuration of the yoke 29p, so that the restoring force is large. As compared with the restoring force 42p, the portion around the restoring force 41p is on the inner side of the range of the configuration of the yoke 29, so that the restoring force is small. Thus, the restoring forces are in the relationship: 41p<42p.

On the other hand, regarding the portions around the restoring forces 43p and 44p, they are both on the inner side of the range of the configuration of the yoke 29 as projected onto a plane orthogonal to the optical axis, so that the difference in magnitude between the restoring forces 43p and 44p is smaller than the difference in magnitude between the restoring forces 41p and 42p. Thus, for the magnet 24p to be magnetically stable with respect to the yoke 29p, a rotation moment 52 is exerted such that the magnet 24p rotates clockwise as illustrated in the diagram.

Next, FIG. 6C illustrates the driving unit in the pitch direction in the case where the third lens group L3 has moved in the yaw direction by the distance d. In this case also, the positional relationship between the magnet 24p and the yoke 29p is changed to generate a restoring force. That is, there is generated a force restoring the driving unit to a magnetically stable state. Here, the configurations of the magnet 24p and the yoke 29p are symmetrical with respect to a center line parallel to the driving direction, so that the magnitudes of the forces 41y and 43y are substantially equal to each other, and the magnitudes of the forces 42y and 44y are substantially equal to each other. Since no movement has been made in the pitch direction, the restoring force 50p is approximately zero as in the case of FIG. 6A.

FIG. 6D illustrates the case where the center of the third lens group L3 has been moved in the pitch direction by the distance d by the Lorentz force 60 generated through energization of the coil 28p (not illustrated). As illustrated with reference to FIG. 6B, a rotation moment 52 is exerted on the magnet 24p. On the other hand, as illustrated with reference to FIG. 6C, a restoring force 51y is exerted on the yaw side magnet 24y. Due to this restoring force 51y, a rotation moment around an axis parallel to the optical axis is exerted on the shift member. As a result, as illustrated in the diagram, a counterclockwise rotational motion is generated in the shift member. Then, the shift member comes to rest at a position where the rotation moment, the restoring force, the Lorentz force, etc., are in equilibrium. Thus, as compared with the conventional construction, the rotation moment due to the restoring force 51y is mitigated by the rotation moment 52 of the pitch side magnet, so that the rotational motion of the shift member is reduced.

FIG. 6E illustrates the case where the center of the third lens group L3 has moved in a direction opposite to that of FIG. 6D by the distance d. As described with reference to FIG. 6B, the rotation moment is acting on the magnet 24p. On the other hand, as in the case of FIG. 6D, the restoring force 51y acts on the yaw side magnet 24y. Due to this restoring force 51y, a rotation moment around an axis parallel to the optical axis acts on the shift member. As a result, a clockwise rotational motion is generated in the shift member as illustrated in the diagram. Then, the shift member comes to rest at a position where all of the rotation moment, the restoring force, the Lorentz force, etc., are in equilibrium. Thus, as compared with the conventional construction, the rotation moment due to the restoring force 51y is mitigated by the rotation moment 52 of the pitch side magnet, so that the rotational motion of the shift member is reduced.

As described above, in the movement in the pitch direction of the movable group, the rotation moment due to the restoring force of the yaw side magnet and the rotation moment of the pitch side magnet are always exerted in opposite directions. Thus, regardless of whether the movable group moves in the pitch upward direction or in the pitch downward direction, the rolling motion of the shift member is reduced. While the above description is restricted to the movement in the pitch direction, the rolling motion is also reduced in a similar fashion in the movement in the yaw direction.

While in FIGS. 6A through 6E both the yokes 29p and 29y are of a substantially trapezoidal configuration, it is also possible for one of them to be of a substantially rectangular configuration, for example, when the rotational motion is to be reduced solely in a certain direction.

As illustrated in FIG. 6A, in the yoke 29p of a substantially trapezoidal configuration, the width in the driving direction thereof nearer to the magnet 24p is indicated by symbol A, and the width in the driving direction thereof farther therefrom is indicated by symbol B. Further, the width in the driving direction of the magnet 24p (when there are a plurality of magnets as illustrated in the diagram, it is the width as measured from end to end of the magnets at both ends) is indicated by symbol C. In this case, it is desirable for these widths and the maximum movement distance dmax to be in the following relationship:

$$A>B \text{ and } C+2d\text{max}>B$$

In this way, in the present exemplary embodiment, due to the rotation moment acting on the magnet through the movement of the shift member, the rotation moment due to the restoring force exerted between the other magnet and the yoke is mitigated, whereby it is possible to reduce the rotational motion of the shift member.

Figure 7A:
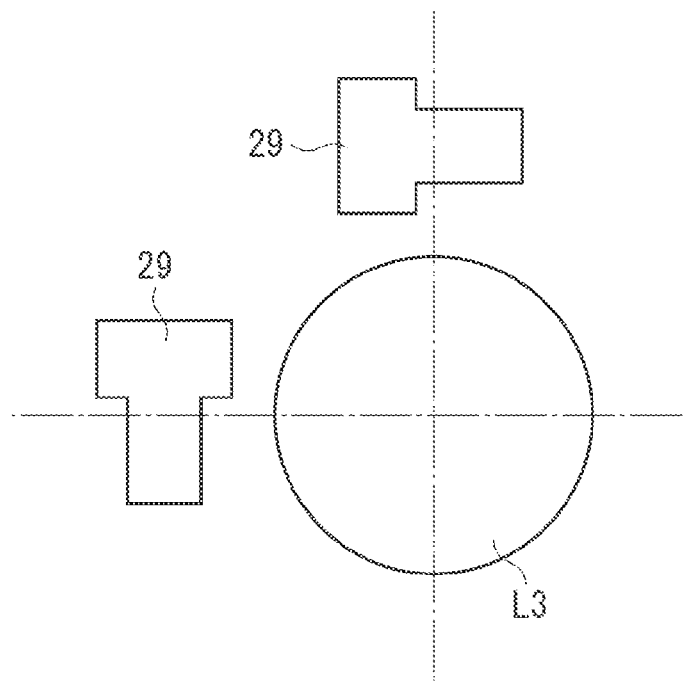
FIGS. 7A through 7D illustrate examples of the configuration of a yoke according to an exemplary embodiment of the present invention.
Figure 7B:
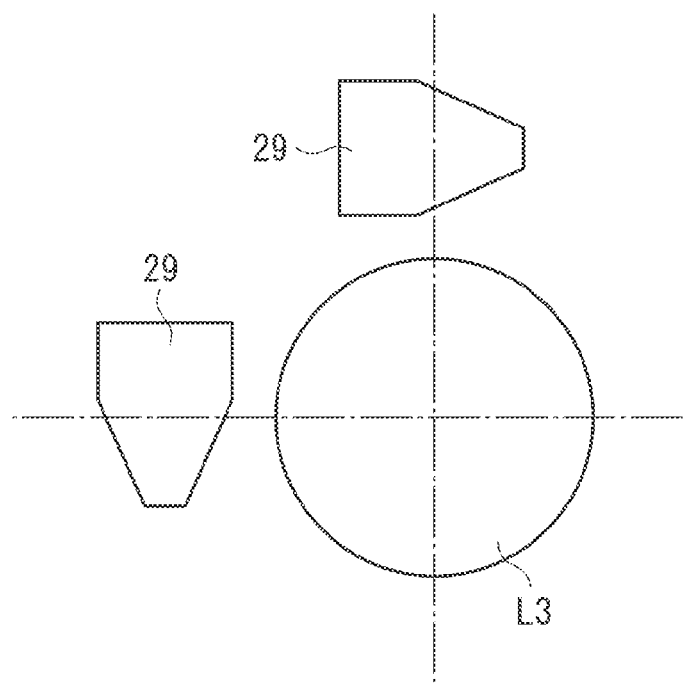
Figure 7C:
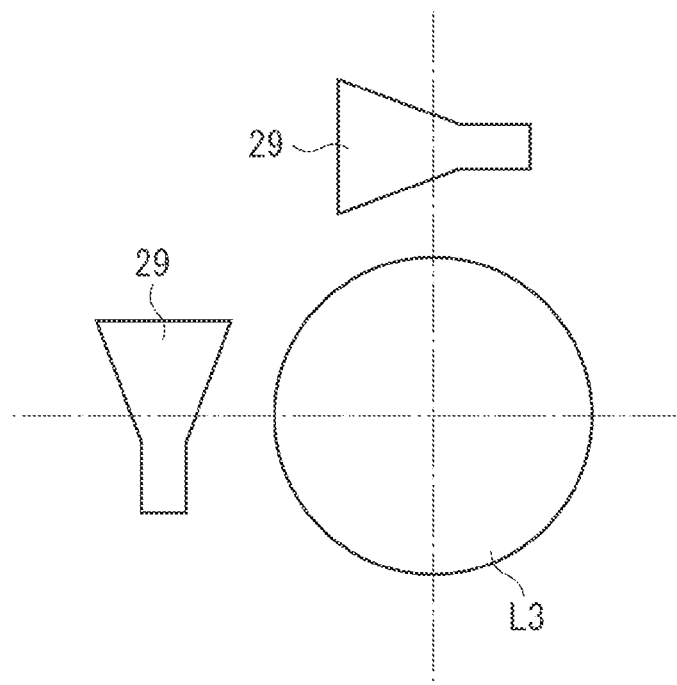
Figure 7D:
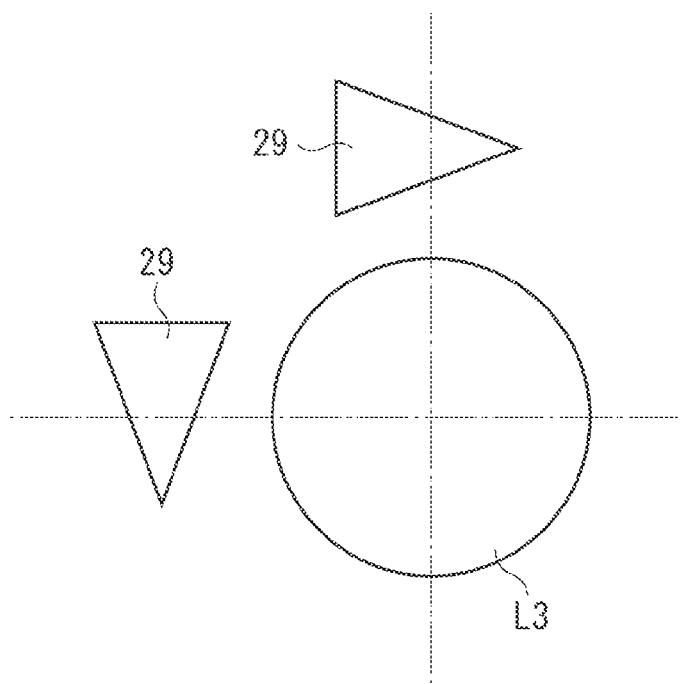

Further, in the above exemplary embodiment, the rotational motion of the shift member is reduced by using the rotation moment of the restoring force exerted between the magnet and yoke generated by making the configuration of the yoke substantially trapezoidal as seen in the direction of the optical axis. However, the gist of the present invention lies in the fact that, when driving the shift member, the moment attributable to the magnetic attractive force between the magnet and the yoke of the actuator is reduced through contrivance in terms of the configuration of the yoke. Thus, the yoke configuration is not restricted to the substantially trapezoidal one; for example, it is also possible to adopt a stepped configuration as illustrated in FIG. 7A, a triangular configuration whose three corners are beveled as illustrated in FIG. 7B, a flask-shaped configuration as illustrated in FIG. 7C, and a substantially triangular configuration as illustrated in FIG. 7D. In the yoke 29 of the driving unit in the pitch direction, for example, these configurations are ones gradually reduced in width as they extend away from the driving unit in the yaw direction. In such a configuration, as it extends away from the driving unit in the yaw direction in a direction orthogonal to the driving direction, the magnetic attractive force generated between the magnet 24p and the yoke 29p is stronger. Thus, it is possible to exert a moment in an opposite direction to the moment due to the driving unit in the yaw direction.

Further, the configuration of the yoke are not restricted to the above-mentioned ones. Suppose, for example, the yoke 29p is divided into two portions by a straight line parallel to the driving direction and passing the middle of the width of the yoke 29p in a direction orthogonal to the driving direction. In this case, the overlapping area of the configuration (shadow) of the magnet 24p and of the configuration (shadow) of the yoke 29p as projected onto a plane orthogonal to the optical axis overlapping each other is smaller in the portion near the driving unit in the yaw direction than in the portion far from the same. This makes it possible to strengthen the restoring force of the portion far from the driving unit in the yaw direction of the magnet 24p. As a result, it is possible to mitigate the moment generated by the driving unit in the yaw direction. That is, in the driving unit in the pitch direction, there are no particular limitations regarding the configuration of the yoke so long as the amount of magnetic flux passing through the yoke is smaller in the portion far from the driving unit in the yaw direction than in the portion near the same.

Thus, any configuration of the yoke is to be covered by the scope of the present invention so long as it embodies the above technical idea.

Figure 8:
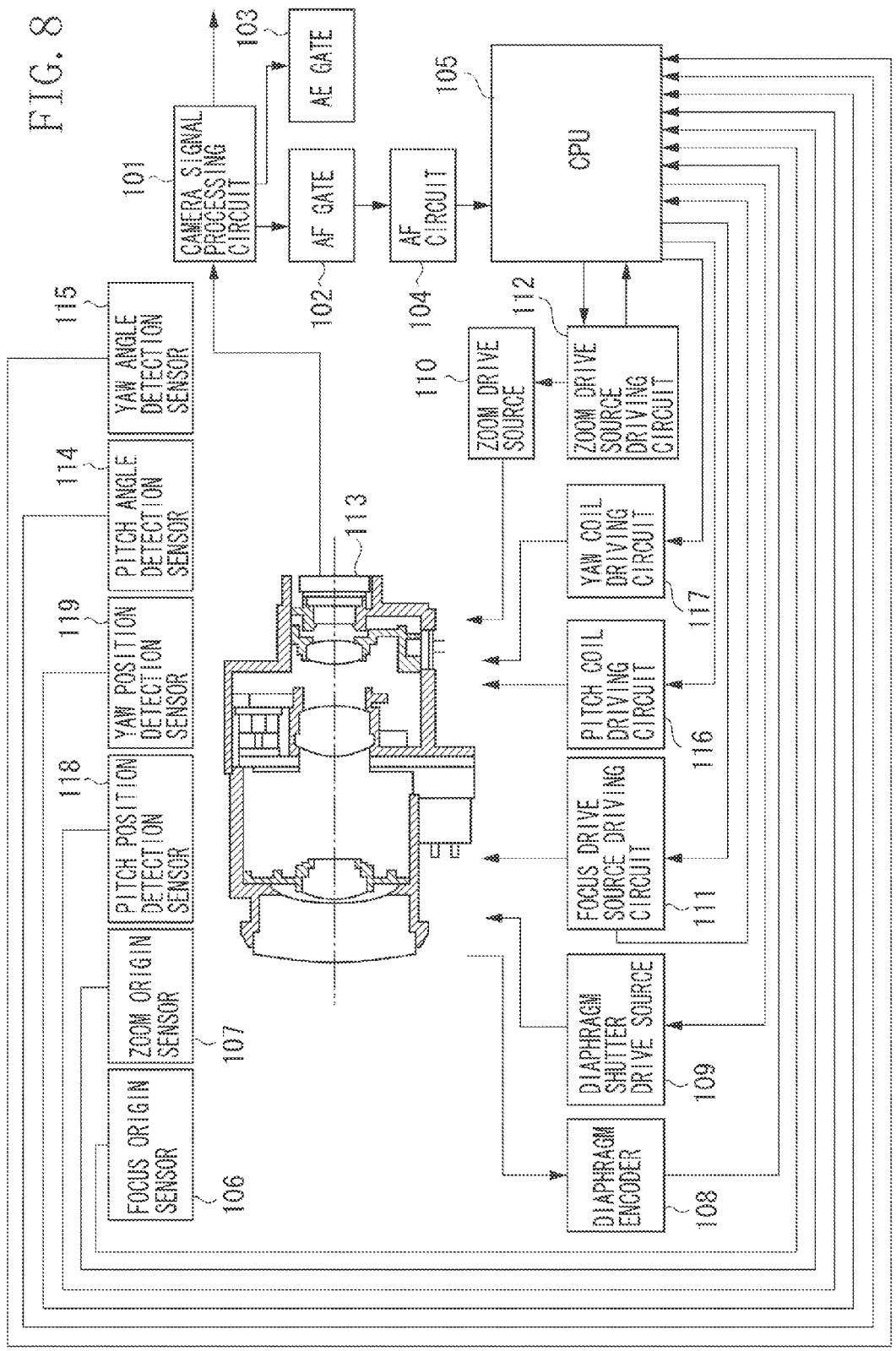
FIG. 8 is a diagram illustrating the construction of an optical apparatus employing a lens barrel according to an exemplary embodiment of the present invention.

FIG. 8 illustrates the electric circuit configuration of an optical apparatus employing a lens barrel according to an exemplary embodiment of the present invention. An image of a subject formed on a charge-coupled device (CCD) sensor 113 via a zoom lens undergoes processing such as a predetermined amplification and gamma correction at a camera signal processing circuit 101. A contrast signal of a predetermined range is extracted from a video signal that has undergone such a processing via an auto focus (AF) gate 102 or an auto exposure (AE) gate 103. In particular, the contrast signal having passed the AF gate 102 generates one or a plurality of outputs related to a high frequency component by an AF circuit 104.

A central processing unit (CPU) 105 determines whether the exposure is optimum according to the signal level of the AE gate 103; when it is not optimum, a diaphragm shutter drive source 109 is driven at an optimum aperture value or shutter speed via the drive source. In an auto focus operation, the CPU 105 controls a focus driving circuit 111, which serves as a focus drive source, such that the output generated at the AF circuit 104 indicates a peak. Further, to obtain correct exposure, the CPU 105 sets the average value of the signal outputs having passed the AE gate 103 as a predetermined value, and drive-controls the shutter drive source 109 such that the output of a diaphragm encoder 108 comes to have the predetermined value to thereby control the aperture diameter.

A focus origin sensor 106 employing an encoder such as a photo interrupter detects an absolute reference position for detecting an absolute position in the optical axis direction of the focus lens group. A zoom origin sensor 107 employing an encoder such as a photo interrupter detects an absolute reference position for detecting an absolute position in the optical axis direction of the zoom lens group.

The detection of a shake angle in a photographing apparatus is performed through integration of the outputs of an angular velocity sensor such as a vibration gyro fixed to the photographing apparatus. The respective outputs of a pitch-direction shake angle detection sensor 114 and a yaw-direction shake angle detection sensor 115 are processed by the CPU 105. According to the output from the pitch shake angle detection sensor 114, a pitch coil driving circuit 116 is drive-controlled, so that the energization of the coil 28p (not illustrated) is controlled. Further, according to the output from the yaw shake angle detection sensor 115, a yaw coil driving circuit 117 is drive-controlled, so that the energization of the coil 28y (not illustrated) is controlled.

Through the control discussed herein, the shift lens frame 22 (not illustrated) moves along a plane orthogonal to the optical axis. The respective outputs of a pitch-direction position detection sensor 118 and a yaw-direction position detection sensor 119 are processed by the CPU 105. When the third lens group L3 held by the shift lens frame 22 (not illustrated) moves in a direction orthogonal to the optical axis, the light beam passing through the lens barrel is bent. Thus, by shifting the lens group L3 so as to compensate for displacement of a subject image (image shake) on the CCD 113 generated through generation of shake in the photographing apparatus, it is possible to perform image-shake correction.

A shake signal of the photographing apparatus is output from the pitch-direction shake angle detection sensor 114 and the yaw-direction shake angle detection sensor 115. Further, a shift amount signal is output from the pitch-direction position detection sensor 118 and the yaw-direction position detection sensor 119. Based on a signal obtained through performing amplification and appropriate phase compensation on a signal corresponding to the difference between the shake signal and the shift amount signal, the CPU 105 causes the shift lens frame 22 to be shifted by the pitch coil driving circuit 116 and the yaw coil driving circuit 117. Through this control, poisoning control is performed on the third lens group L3 so as to further diminish the above differential signal, thus maintaining the lens group at the target position.

In the exemplary embodiment described above, the shift lens frame 22 is driven by using a moving magnet type actuator. However, the present invention is also applicable to a case where there is employed a moving coil type actuator, in which the coil 28 and the yoke 29 are arranged on the magnet base 18 side, with the yoke 23 and the magnet 24 being arranged on the shift base 21 side.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-221795 filed Sep. 30, 2010, which is hereby incorporated by reference herein in its entirety.

What is claimed is:

1. An image-shake correction device for reducing image shake, the image-shake correction device comprising:
    a shift member configured to support a lens and to be able to move;
    a first driving unit configured to move the shift member in a first direction along a plane orthogonal to an optical axis; and
    a second driving unit configured to move the shift member in a second direction that is different from the first direction along the plane orthogonal to the optical axis,
    wherein each of the first and second driving units includes a magnet, a coil, and a yoke, a magnetic attractive force being generated between the yoke and the magnet,
    wherein the shift member is moved by energizing the coil, and
    wherein, to generate a magnetic attractive force for reducing a moment acting on the shift member due to the magnetic attractive force generated between the magnet and the yoke of the second driving unit when the first driving unit is driven, the yoke of the first driving unit is shaped such that when the yoke of the first driving unit is divided into two portions by a straight line parallel to the first direction and passing a middle of a width of the yoke of the first driving unit in a direction orthogonal to the first direction in the plane orthogonal to the optical axis, an amount of magnetic flux from the magnet of the first driving unit passing through the yoke of the first driving unit is larger in one of the two portions nearer to the second driving unit than in another of the two portions farther from the second driving unit.

2. The image-shake correction device according to claim 1, wherein the yoke of the first driving unit is shaped such that when the yoke of the first driving unit is divided into two portions by a straight line parallel to the first direction and passing a middle of a width of the yoke of the first driving unit in a direction orthogonal to the first direction in the plane orthogonal to the optical axis, a volume of one of the two portions that is nearer to the second driving unit is larger than a volume of another of the two portions that is farther from the second driving unit.

3. The image-shake correction device according to claim 1, wherein the yoke of the first driving unit as projected onto the plane orthogonal to the optical axis is of a trapezoidal configuration.

4. The image-shake correction device according to claim 1, wherein the magnet of the first driving unit as projected onto the plane orthogonal to the optical axis is of a rectangular configuration whose longitudinal direction is orthogonal to a driving direction.

5. The image-shake correction device according to claim 1, wherein, to generate a magnetic attractive force for reducing a moment acting on the shift member due to the magnetic attractive force generated between the magnet and the yoke of the first driving unit when the second driving unit is driven, the yoke of the second driving unit is shaped such that when the yoke of the second driving unit is divided into two portions by a straight line parallel to the second direction and passing a middle of a width of the yoke of the second driving unit in a direction orthogonal to the second direction in the plane orthogonal to the optical axis, an amount of magnetic flux from the magnet of the second driving unit passing through the yoke of the second driving unit is larger in one of the two portions nearer to the first driving unit than in another of the two portions farther from the first driving unit.

6. The image-shake correction device according to claim 5, wherein the yokes of the first and second driving units as projected onto the plane orthogonal to the optical axis are of a trapezoidal configuration.

7. The image-shake correction device according to claim 5, wherein the magnets of the first and second driving units as projected onto the plane orthogonal to the optical axis are of a rectangular configuration whose longitudinal direction is orthogonal to a driving direction.

8. The image-shake correction device according to claim 1, further comprising:
a shift base configured to hold the coil and the yoke;
a magnet base fixed to the shift member and configured to hold the magnet; and
a ball arranged between the shift base and the magnet base and configured to roll when the shift member moves with respect to the shift base along the plane orthogonal to the optical axis,
wherein the ball is held between the shift base and the magnet base by the magnetic attractive force generated between the magnet and the yoke.

9. The image-shake correction device according to claim 1, wherein the first direction and the second direction are orthogonal to each other.

10. A lens barrel comprising an image-shake correction device,
wherein the image-shake correction device has,
a shift member configured to support a lens and to be able to move;
a first driving unit configured to move the shift member in a first direction along a plane orthogonal to an optical axis; and
a second driving unit configured to move the shift member in a second direction that is different from the first direction along the plane orthogonal to the optical axis,
wherein each of the first and second driving units includes a magnet, a coil, and a yoke, a magnetic attractive force being generated between the yoke and the magnet,
wherein the shift member is moved by energizing the coil, and
wherein, to generate a magnetic attractive force for reducing a moment acting on the shift member due to the magnetic attractive force generated between the magnet and the yoke of the second driving unit when the first driving unit is driven, the yoke of the first driving unit is shaped such that when the yoke of the first driving unit is divided into two portions by a straight line parallel to the first direction and passing a middle of a width of the yoke of the first driving unit in a direction orthogonal to the first direction in the plane orthogonal to the optical axis, an amount of magnetic flux from the magnet of the first driving unit passing through the yoke of the first driving unit is larger in one of the two portions nearer to the second driving unit than in another of the two portions farther from the second driving unit.

11. An optical apparatus comprising a lens barrel including an image-shake correction device,
wherein the image-shake correction device has,
a shift member configured to support a lens and to be able to move;
a first driving unit configured to move the shift member in a first direction along a plane orthogonal to an optical axis; and
a second driving unit configured to move the shift member in a second direction that is different from the first direction along the plane orthogonal to the optical axis,
wherein each of the first and second driving units includes a magnet, a coil, and a yoke, a magnetic attractive force being generated between the yoke and the magnet,
wherein the shift member is moved by energizing the coil, and
wherein, to generate a magnetic attractive force for reducing a moment acting on the shift member due to the magnetic attractive force generated between the magnet and the yoke of the second driving unit when the first driving unit is driven, the yoke of the first driving unit is shaped such that when the yoke of the first driving unit is divided into two portions by a straight line parallel to the first direction and passing a middle of a width of the yoke of the first driving unit in a direction orthogonal to the first direction in the plane orthogonal to the optical axis, an amount of magnetic flux from the magnet of the first driving unit passing through the yoke of the first driving unit is larger in one of the two portions nearer to the second driving unit than in another of the two portions farther from the second driving unit.

* * * * *